(12) United States Patent
Eriksson et al.

(10) Patent No.: US 7,830,952 B2
(45) Date of Patent: Nov. 9, 2010

(54) REDUCED COMPLEXITY INTERFERENCE SUPPRESSION FOR WIRELESS COMMUNICATIONS

(75) Inventors: Hakan Bengt Eriksson, Taby (SE); Carmela Cozzo, Cary, NC (US); Ali S. Khayrallah, Cary, NC (US); Gregory E. Bottomley, Cary, NC (US); Yi-Pin Eric Wang, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1245 days.

(21) Appl. No.: 11/276,069

(22) Filed: Feb. 13, 2006

(65) Prior Publication Data

US 2007/0189363 A1      Aug. 16, 2007

(51) Int. Cl.
*H04B 1/00*       (2006.01)
(52) U.S. Cl. ...................................... 375/148
(58) Field of Classification Search ........... 375/142, 375/143, 144, 148, 150, 152, 316, 343, 346; 704/216, 218, 237, 263; 708/5, 422, 813; 342/108, 145, 189, 378; 370/320, 335, 342, 370/441; 455/63.1, 114.2, 278.1, 296
See application file for complete search history.

(56) References Cited

U.S. PATENT DOCUMENTS

| 7,496,153 | B2 * | 2/2009 | Orlik et al. | ................ 375/308 |
| 2005/0069024 | A1 * | 3/2005 | Li et al. | ................ 375/148 |

FOREIGN PATENT DOCUMENTS

EP      1172941 A2      1/2002

\* cited by examiner

*Primary Examiner*—Sam K Ahn

(57) ABSTRACT

The computational complexity required for interference suppression in the reception of wireless communications from multiple users is reduced by sharing information among the users. In some situations, information indicative of a statistical characteristic of the interference is shared among the users. Delays used to produce the interference statistic information are determined based on rake finger delays employed by the users. In some situations, a parameter estimate that is used to calculate combining weights for the users is shared among the users.

34 Claims, 8 Drawing Sheets

REDUCED COMPLEXITY INTERFERENCE SUPPRESSION FOR WIRELESS COMMUNICATIONS

FIELD OF THE INVENTION

The invention relates generally to wireless communications and, more particularly, to interference suppression in wireless communications.

BACKGROUND OF THE INVENTION

Interference suppression is a well-known technique that can be used to improve the performance of wireless communication receivers in the presence of multiple access interferers. Consider for example a wireless communication system including a base station that receives communication signaling from multiple users. In such a system, the signal received by the base station can be modeled as $$y(t) = \sum_{k} r_k(t) + n(t),$$

where $r_k(t)$ is the signal received from user k and n(t) is the additive Gaussian noise used to model thermal noise in the receiver front end. If the user transmits at a relatively high data rate with multiple parallel codes and a low spreading factor, self-interference is usually present.

FIG. 1 illustrates an example of a system with a data user that transmits at a relatively high data rate, and other users (e.g., voice users) that transmit at a relatively low rate. The signal received from each user at the base station can be described as $r_k(t) = h_k(t) \otimes a_k(t)$, where $\otimes$ denotes convolution, and $$h_k(t) = \sum_{m=1}^{L_k} h_{k,m} \delta(t - \tau_{k,m})$$

is the baseband equivalent impulse response of a multipath channel, where $L_k$ is the number of resolvable paths associated with user k, $h_{k,m}$ and $\tau_{k,m}$ are the complex-valued channel coefficients and delays, respectively, for the m-th path associated with user k. The signal transmitted by user k is $$a_k(t) = \sqrt{E} \sum_{m} b_{k,m} \sum_{n=0}^{N-1} c_{k,m}(n) p(t - nT_C - mT)$$

where E is the average chip energy, $b_{k,m}$ is the transmitted symbol, $c_{k,m}(n)$ is the spreading code, N is the spreading factor, p(t) is the normalized chip pulse shape, $T_c$ is the chip duration and T is the symbol duration.

In conventional wireless communication systems that use direct sequence code-division multiple-access (DS-CDMA) technology, the receiver is typically implemented as a Rake receiver. The Rake receiver is a matched filter that is matched to the operations of spreading, pulse shape filtering, and channel filtering. This matched filter maximizes the signal-to-noise ratio at its output when the interference plus noise is white. The Rake receiver includes correlators that despread different delayed versions of the received signal. The despread values are then combined to form soft values. If the despread values are collected in a vector x, then the symbol estimate is given by $z = w^H x$, where w is the vector of the combining weights, and the superscript H denotes Hermitian transpose. The combining weights of a Rake receiver are given by w=h, where h is the vector of the estimated channel coefficients (also referred to herein as the channel estimate vector). In systems with two receive antennas at the base station, it can be assumed that the combining weights vector w and the estimated channel coefficients vector h both have a length equal to the total number of Rake fingers summed over the antennas.

Rake receivers model interference as white noise. Thus, as indicated above, they work best when the interference plus noise is white, and their performance deteriorates in the presence of colored noise. A whitening matched filter, such as is essentially provided by G-Rake (Generalized Rake) receivers and chip equalizers, is preferable in the presence of colored noise.

Conventional G-Rake receivers model interference as colored noise, and can provide interference suppression superior to that of Rake receivers in situations where the interference is colored. The G-Rake receiver structure is similar to the Rake receiver, but uses different combining weights, and may have extra fingers. The G-Rake receiver is, as mentioned above, in essence a whitening matched filter. It uses an impairment correlation matrix to describe the second-order properties of the interference plus noise. The combining weights in a G-Rake receiver are obtained by multiplying the channel coefficients vector by the inverse of this correlation matrix. The combining operation in a G-Rake receiver can be viewed as a filtering operation that comes after despreading. The combining weights for a G-Rake receiver are given by $w = R^{-1} h$, where R is the aforementioned correlation matrix. The G-Rake receiver must therefore be able to provide a suitable correlation matrix R.

Conventional chip equalizers are similar to G-Rake receivers, except that the order of despreading and combining is reversed. A filtering or combining operation is performed first, at the chip level, using filter coefficients that correspond to the G-Rake combining weights, and using filter tap locations that correspond to the G-Rake finger locations (delays). The filtering operation is followed by a despreading operation. Like the G-Rake receiver, the filter coefficients for a chip equalizer can be determined from a correlation matrix and a channel coefficient vector. In general, the receiver uses demodulation delays that correspond to rake finger delays in a G-Rake receiver and filter tap locations in a chip equalizer.

Various conventional systems use different approaches to the problem of estimating the correlation matrix. One approach uses the despread values associated with pilot symbols. Impairment samples are obtained by subtracting the channel coefficient estimates from the pilot symbol despread values. These samples are then multiplied and averaged over multiple symbols to form the correlation estimates that populate the correlation matrix. The aforementioned pilot symbol despread values will of course differ for each user, so a correlation matrix is computed for each user. Each correlation matrix R is then inverted, and the inverted matrix $R^{-1}$ is then multiplied by the corresponding channel coefficients vector h, in order to produce the combining weights vector w according to $w = R^{-1} h$. Alternatively, iterative approaches such as the Gauss-Seidel method are used to solve Rw=h for w.

Another conventional approach uses the received signal directly (before despreading) to estimate a related correlation matrix. For example, a chip sample correlation matrix is a form of interference statistics, as it includes information about the interference. Each user computes its own correlation matrix based on the received chip samples and its own corresponding finger delays. The channel coefficient estimates are computed from the despread values of the pilot symbols. Each correlation matrix R is then used to solve for w using Rw=h. FIG. 2 generally illustrates this approach. In response to the baseband signal 25 received from the front end part, the correlation matrix computer units produce the correlation matrices for the associated users. Each weight computer unit 23 produces a combining weight vector w using a correlation matrix R and a channel coefficient vector h. The combining weights of the weight vector w produced by each user's weight computer unit 23 are used to combine the despread traffic value vector elements to form traffic symbol estimates, z, which are provided to the additional receiver processing unit for demodulation/decoding ($z=w^H y$, where y is the despread traffic vector). FIG. 2A illustrates a combining unit that combines the traffic despread values and the combining weights to produce symbol estimates processed by the additional receiver processing unit.

The estimation and possible inversion of a correlation matrix can be relatively complex computational procedures, and the aforementioned conventional approaches can easily necessitate a large number of these procedures. In fact, the number of correlation matrix estimation and inversion operations is typically proportional to the number of users. This can lead to undesirable increases in the complexity and cost of the receiver.

It is desirable in view of the foregoing to provide for interference suppression in the reception of CDMA communications from multiple users, while avoiding the aforementioned difficulties associated with prior art approaches.

SUMMARY OF THE INVENTION

Exemplary embodiments of the invention reduce the computational complexity required for interference suppression in the reception of wireless communications from multiple users. Some embodiments share among the users information indicative of a statistical characteristic of the interference. In some embodiments, delays used to produce the interference statistic information are determined based on rake finger delays employed for the users. Some embodiments share among the users a parameter estimate that is used to calculate combining weights for the users.

DETAILED DESCRIPTION

Figure 1:
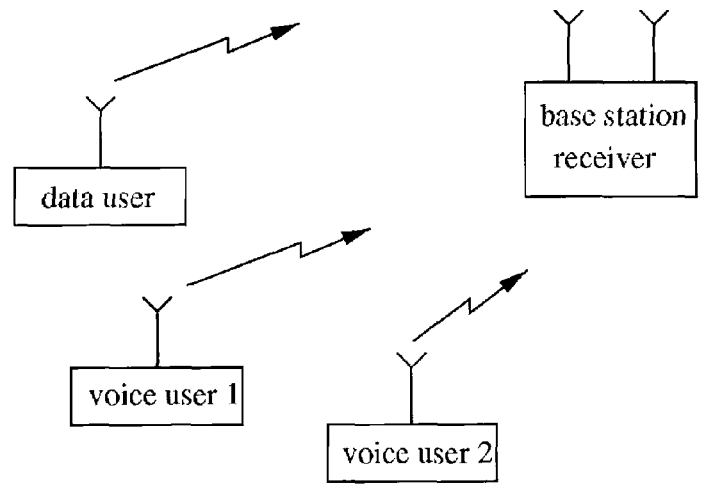
FIG. 1 diagrammatically illustrates an example of a wireless communication system in which principles according to the present invention can be implemented.

Exemplary embodiments of the invention exploit situations where the receiver receives a signal that is shared by a plurality of users. For example, in the arrangement of FIG. 1, the receiver of all users in the base station receives an uplink signal that is shared by all of the illustrated users. These types of situations provide opportunities for multiple users to share the results of computationally expensive operations, for example, the operations associated with estimating and inverting an impairment correlation matrix in a G-Rake receiver. Taking the prior art G-Rake receiver arrangement of FIG. 2 as an illustrative example, although correlation matrices are produced for each of the respective users, nevertheless all of the correlation matrices are computed from the same input, namely, the received uplink signal (shared by all users) provided by the RF front end part.

A similar example is the downlink, in which a terminal demodulates control and information signals from different base station transmitters. The combining weights are different, but share a common correlation matrix. In general, the receiver receives communication signal components that may correspond to different user signals in the uplink or different control and information signals with different channel responses in the downlink. If two signals share the same channel response, then they are considered part of the same communication signal component. Although exemplary embodiments of the invention are described herein with respect to the uplink, this is for convenience of exposition only, and it will be understood that the invention is also applicable to the downlink.

Exemplary embodiments of an interference-suppressing receiver such as a G-Rake or chip equalizing receiver according to the invention compute one correlation (or inverse correlation) matrix from the received chip samples that are shared on uplink by multiple users. By utilizing suitable matrix manipulations, the vectors of combining weights for the respective users can all be produced based on the one correlation (or inverse correlation) matrix. This substantially reduces the computational complexity required for interference suppression, and thereby reduces the complexity and cost of the receiver.

In some embodiments, all users share an estimated inverse correlation matrix. For each user, the inverse correlation matrix is modified, and the modified matrix is used to compute the weights. The modified matrix is produced based on the finger delays employed for that user. In other embodiments where all users share an estimated inverse correlation matrix, a modified version of each user's channel estimate vector is used to compute the combining weights for that user. The modified channel estimates vector for a given user is produced based on the finger delays employed for that user.

Figure 13:
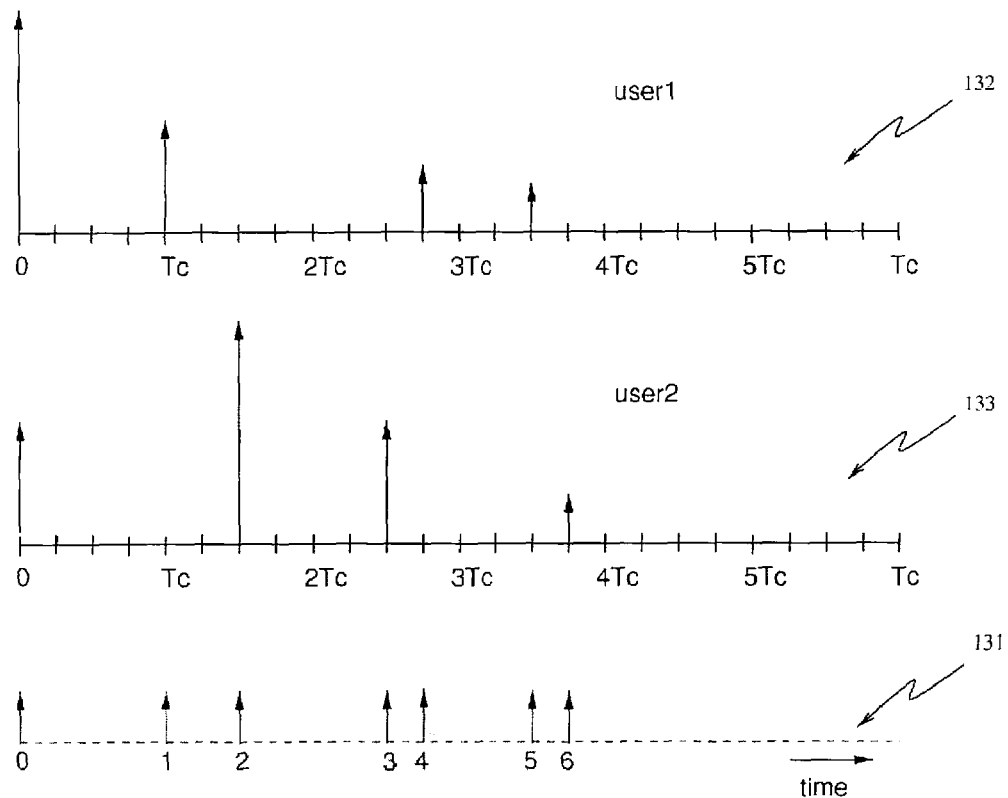

In some embodiments, the set of delays used to estimate the shared inverse correlation matrix is the union of the rake finger delays of all users. This can be represented as $$\Gamma = \bigcup_{k=1}^{K} \Gamma_k$$

where $\Gamma$ is the vector of delays used for the correlation matrix, $\Gamma_k$ is the vector of finger delays of user k, and K is the number of users. A simple example of this for two users is shown in FIG. 13, wherein the union of delays is designated 131, and the finger delays employed for user 1 and user 2 are designated at 132 and 133, respectively. Note that these delays can be relative delays and have a sampling phase associated with them.

Figure 12:
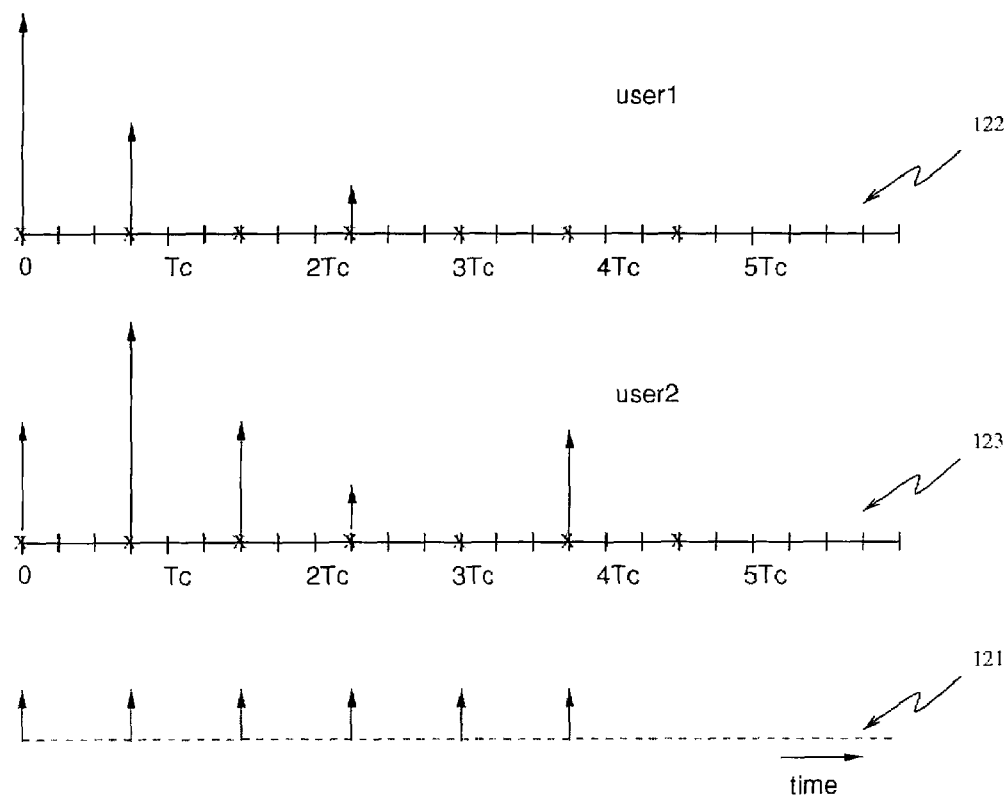
FIGS. 12-14 graphically illustrate exemplary relationships between users' rake finger delays, and delays used to produce impairment correlation values according to exemplary embodiments of the invention.

In some embodiments, the delays for the estimation of the shared (inverse) correlation matrix define a grid of equally spaced delays that covers the delay spread of the channels seen by the different users. The finger delays of all users are also arranged according to the grid positions. FIG. 12 illustrates a simple example of this for two users. The grid of equally spaced delays is designated 121, and the finger delays employed for user 1 and user 2 are designated at 122 and 123, respectively. Each x shown on the time axes at 122 and 123 indicates an allowed position for finger delay placement, that is, the 'x's designate the grid of allowed finger delays. As shown, a grid of ¾-chip spaced delays can be designed to cover the overall region of energy.

When using the chip samples to form the correlation matrix, further scaling can be used to properly scale soft information for forward error correction decoding. The present invention can be used in conjunction with such scaling, which is described in co-pending U.S. Ser. No. 11/158,665, filed on Jun. 22, 2005 and incorporated herein by reference.

Figure 2:
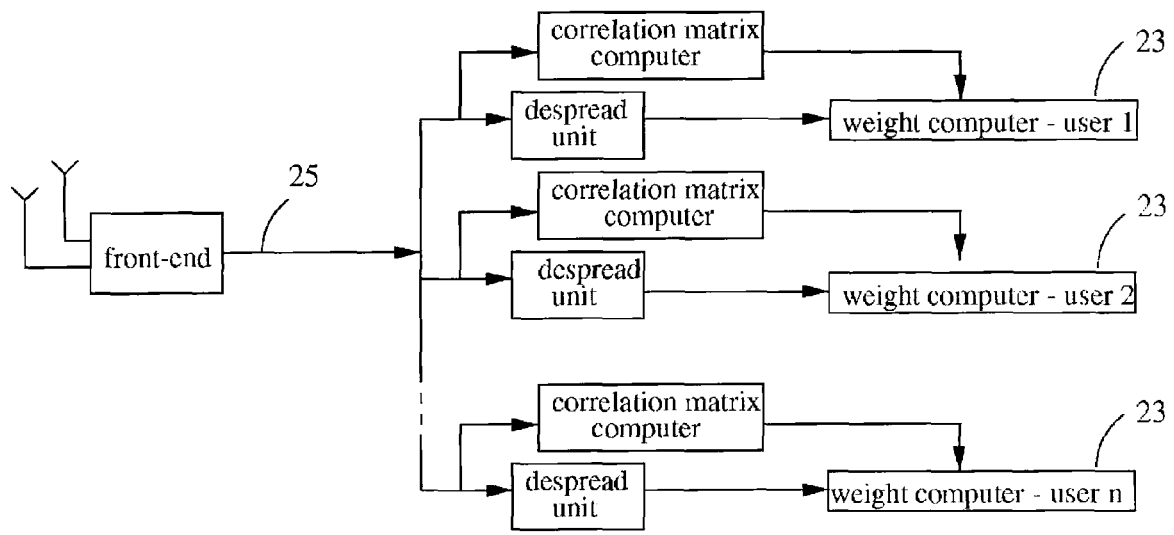
FIGS. 2 and 2A diagrammatically illustrate a conventional example of the base station receiver of FIG. 1.
Figure 2A:
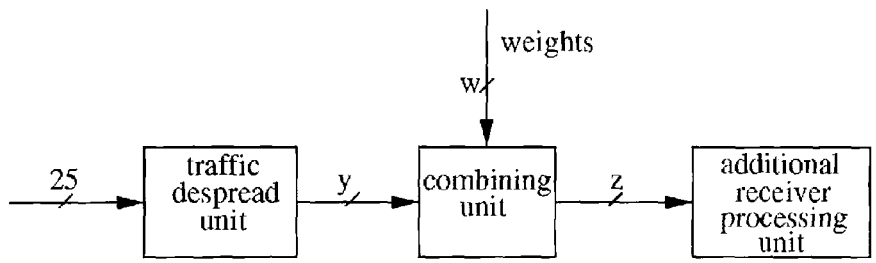
Figure 3:
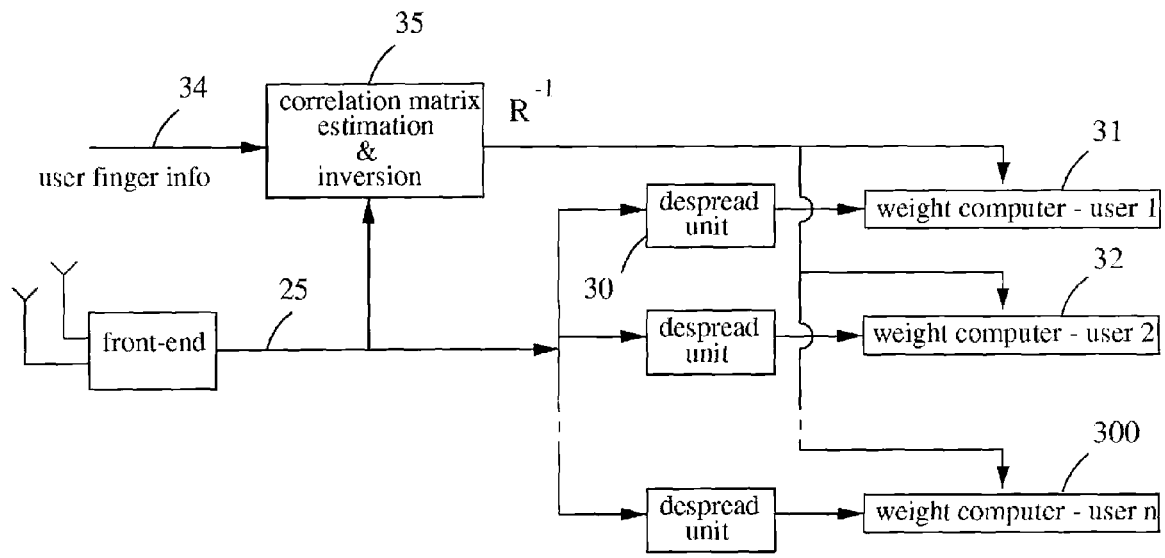
FIG. 3 diagrammatically illustrates a wireless communication receiver apparatus that uses a shared inverse correlation matrix according to exemplary embodiments of the invention.

FIG. 3 diagrammatically illustrates a wireless communication receiver apparatus with interference suppression capability according to exemplary embodiments of the invention. The apparatus of FIG. 3 implements the aforementioned shared inverse correlation matrix technique. In some embodiments, the apparatus of FIG. 3 is provided in a fixed-site base station such as shown in FIG. 1. An interference statistic unit 35 produces in response to the input signal 25 an estimated correlation matrix, and also inverts that matrix to produce the aforementioned inverse correlation matrix $R^{-1}$. In some embodiments, the matrix inversion operation is omitted, and the inverse correlation matrix is estimated directly, for example, by using the recursive least-squares (RLS) algorithm. The interference statistic unit 35 determines the delays to use based on information indicative of the finger delays employed for the users, as illustrated at 34. The shared inverse correlation matrix $R^{-1}$ is provided to a plurality of signal processing paths 31, 32, . . . 300. These signal processing paths extend into respective weight computer units that are respectively associated with the users. Despreading units associated with the respective users are operable in response to the signal 25 to provide despread signals to their associated weight computer units as shown.

In some shared inverse correlation matrix embodiments, each user's weight computer inserts zeros or small values into (i.e., zero-pads) the user's channel estimate vector. This zero-padding provides placeholder components in the channel estimate vector to account for delays used by the interference statistic unit 35 that do not correspond to that user's finger delays. If $h_k$ is the vector of the channel estimates of user k, and $\tilde{h}_k$ is the vector of the channel estimates after adding the zeros, the weights for user k are the components of $\tilde{w}_k = R^{-1}\tilde{h}_k$ that correspond to non-zero components of the vector $\tilde{h}_k$. The weight vector computation is illustrated in FIG. 4, and examples of zero-padded vectors $\tilde{h}_k$ for users corresponding to k=1 and 2, i.e. $\tilde{h}_1$ and $\tilde{h}_2$, are shown in FIG. 4A.

Figures 4, 4A:
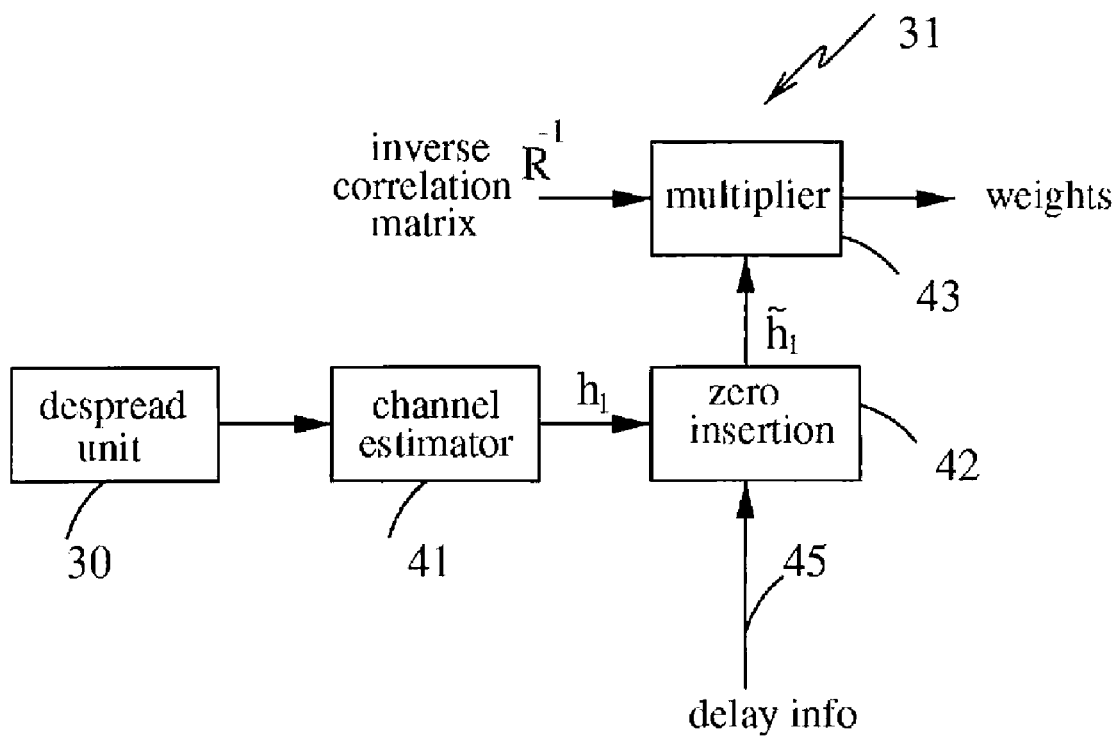
FIG. 4 diagrammatically illustrates a weight computer of FIG. 3 according to exemplary embodiments of the invention.
FIG. 4A illustrates examples of zero-padded vectors that can be used in the weight computer of FIG. 4.

FIG. 4 diagrammatically illustrates a weight computer unit of FIG. 3 according to exemplary embodiments of the invention. The example of FIG. 4 shows the weight computer unit for user 1 of FIG. 3. The remaining weight computer units of FIG. 3 are structurally and functionally analogous in some embodiments. As shown in FIG. 4, the signal processing path 31 includes a multiplier 43, which multiplies the inverse correlation matrix $R^{-1}$ by the zero-padded channel estimate vector $\tilde{h}_1$ to produce the combining weights for the user. The zero-padded vector $\tilde{h}_1$ is produced by operation of a zero-padding unit 42 on the channel estimate vector $h_1$, which is produced by channel estimator 41 using pilot symbol despread values from the associated despread unit. The zero-padding unit 42 performs the zero-padding based on information indicative of the delays used by the interference statistic unit 35 (see also FIG. 3), as illustrated at 45.

In other shared inverse correlation matrix embodiments, each user reduces the inverse correlation matrix by eliminating rows and columns thereof that do not correspond to fingers for that user. The weight vector is then $w_k = \tilde{R}_k^{-1} h_k$, where $\tilde{R}_k^{-1}$ is the reduced inverse correlation matrix for user k. This reduction in the size of the inverse correlation matrix also reduces the computational complexity of the weight vector computation. This weight vector computation is illustrated in FIG. 5.

Figure 5:
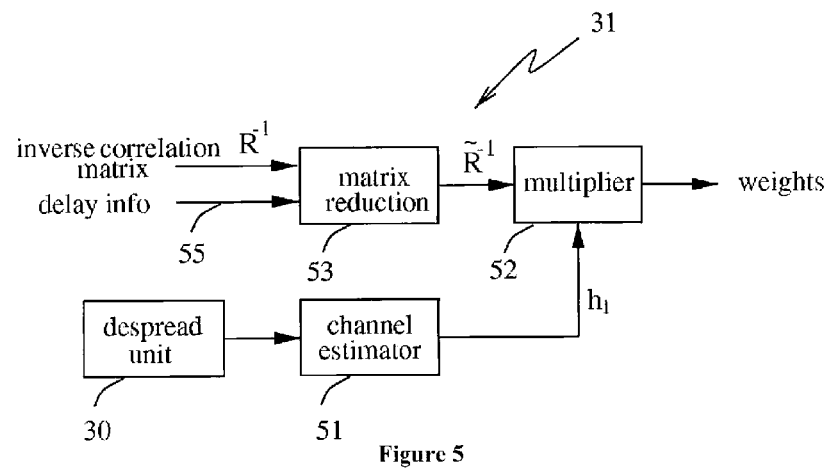
FIG. 5 diagrammatically illustrates a weight computer of FIG. 3 according to further exemplary embodiments of the invention FIG. 6 diagrammatically illustrates a wireless communication receiver apparatus that uses a shared correlation matrix according to exemplary embodiments of the invention.

FIG. 5 diagrammatically illustrates a weight computer unit of FIG. 3 according to exemplary embodiments of the invention. The example of FIG. 5 shows the weight computer unit for user 1 of FIG. 3. The remaining weight computer units of FIG. 3 are structurally and functionally analogous in some embodiments. As shown in FIG. 5, the signal processing path 31 includes a matrix reduction unit 53 that removes from the inverse correlation matrix $R^{-1}$ the rows and columns thereof that do not correspond to the rake fingers employed for user 1. The matrix reduction unit 53 determines which rows and columns to remove based on information indicative of the delays used by the interference statistic unit 35 (see also FIG. 3), as illustrated at 55. The signal processing path 31 also includes a multiplier 52 that multiplies the reduced inverse correlation matrix $\tilde{R}_1^{-1}$ by the channel estimate vector $h_1$, which is produced by channel estimator 51.

Figure 14:
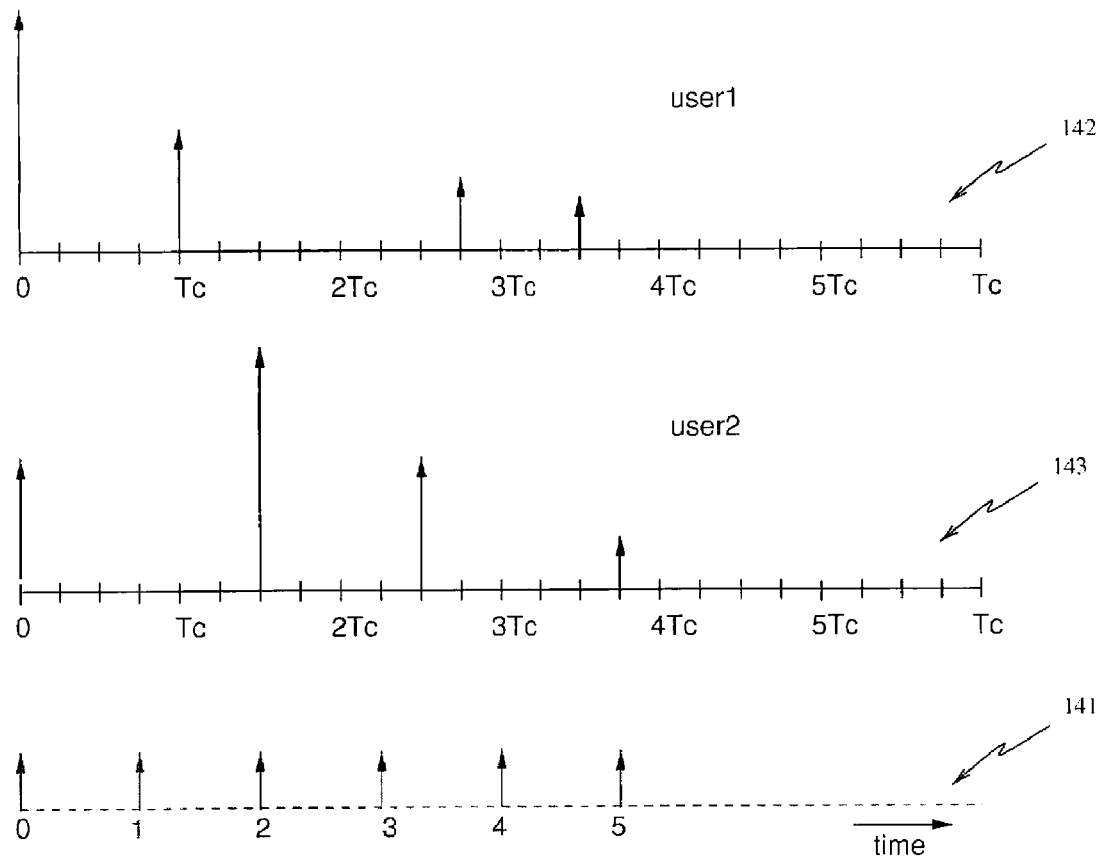

In some instances, the grids of the various users are not synchronized with one another, or the users do not employ fixed grid searcher strategies. Under these types of circumstances and others, if the correlation matrix is produced using delays corresponding to all finger delays of all users (as in the example of FIG. 13), then the correlation matrix can become quite large. This results in increased complexity for both the computation and inversion of the correlation matrix. Accordingly, some embodiments use a suitably chosen grid of delays, for example, a grid of equally spaced delays that covers the largest delay spread. FIG. 14 illustrates a simple example of this situation for two users, wherein the grid of delays is designated 141, and the finger delays employed for user 1 and user 2 are designated at 142 and 143, respectively. The grid of delays 141 can be used to produce a correlation matrix that the users share. Each user can interpolate correlation values as needed to compensate for differences between any of its finger delays and the grid of delays (e.g., grid 141 of FIG. 14) used to produce the correlation matrix. The interpolation of correlation values can be performed according to any suitable interpolation technique, some examples of which are described in copending U.S. Ser. No. 10/953,010, filed on Sep. 29, 2004, which is incorporated herein by reference.

Figure 6:
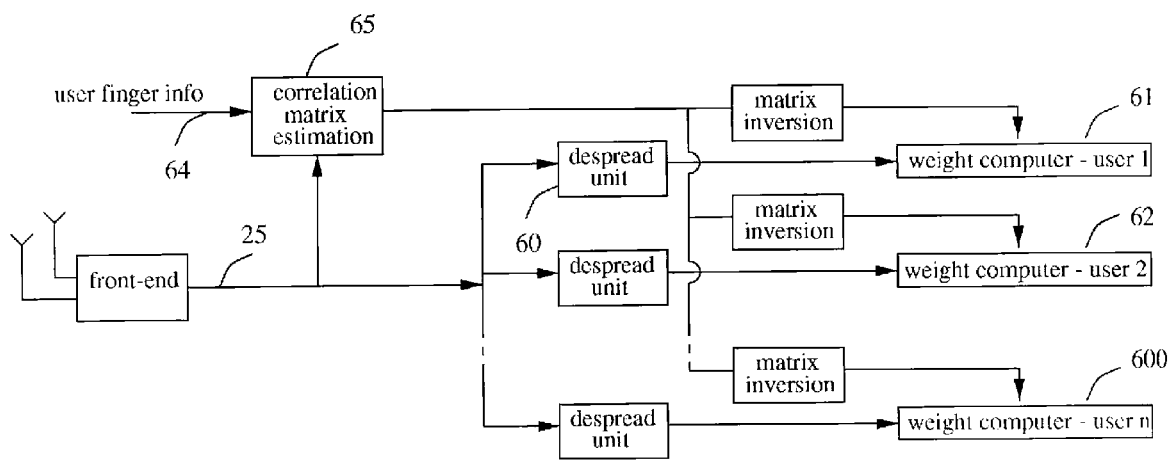

FIG. 6 diagrammatically illustrates a wireless communication receiver apparatus with interference suppression capability according to exemplary embodiments of the invention. The apparatus of FIG. 6 implements the aforementioned shared correlation matrix technique. In some embodiments, the apparatus of FIG. 6 is provided in a fixed-site base station such as shown in FIG. 1. As shown in FIG. 6, an interference statistic unit 65 produces an estimated correlation matrix R in response to the input signal 25. The interference statistic unit 65 determines what delays should be used based on information indicative of the finger delays employed for the users, as illustrated at 64. The shared estimated correlation matrix R is provided to a plurality of signal processing paths 61, 62, . . . 600. These signal processing paths extend into respective weight computer units that are respectively associated with the users. Despreading units associated with the respective users are operable in response to the signal 25 to provide despread signals to their associated weight computer units as shown. For example, the despreading unit 60 despreads signals for user 1 in FIG. 6.

Figure 7:
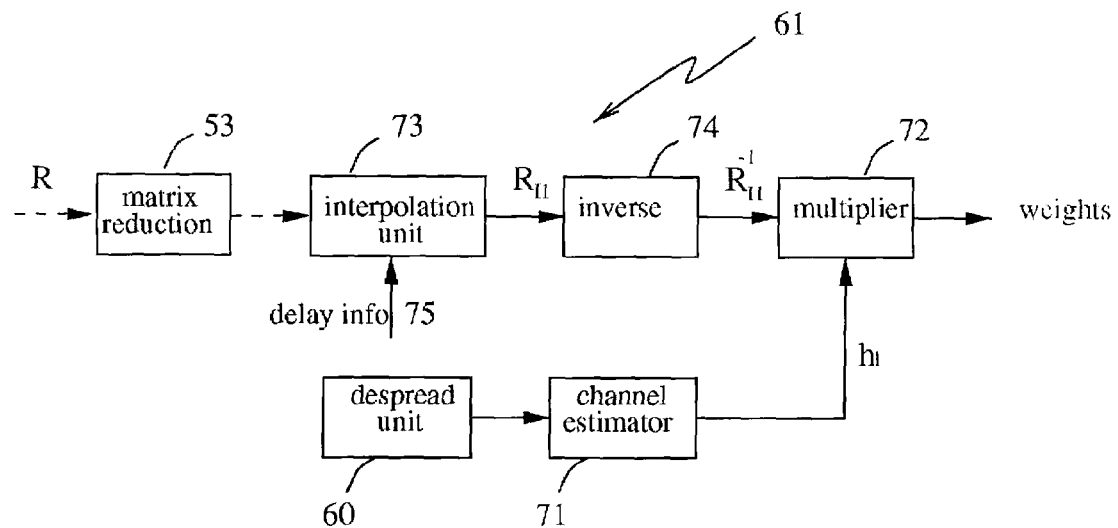
FIG. 7 diagrammatically illustrates a weight computer of FIG. 6 according to exemplary embodiments of the invention.

Correlation matrices for the respective users are computed individually within the associated weight computer units of FIG. 7 by eliminating rows and columns thereof that do not correspond to fingers for that user and interpolating correlation values from the shared correlation matrix R as necessary. As mentioned above, the interpolation associated with a given user compensates for differences between the finger delays employed for that user and the delay grid employed for the interference statistic unit 65 to produce the shared correlation matrix R. In some embodiments, each user's individually interpolated correlation matrix (denoted by $R_{jk}$) is inverted directly. The resulting inverted matrix is then multiplied by the user's channel estimate vector h to compute the vector of combining weights, generally in the same manner described above. This is illustrated in FIG. 7.

FIG. 7 diagrammatically illustrates a weight computer unit of FIG. 6 according to exemplary embodiments of the invention. The example of FIG. 7 shows the weight computer unit for user 1 of FIG. 6. The remaining weight computer units of FIG. 6 are structurally and functionally analogous in some embodiments. As shown in FIG. 7, the signal processing path 61 (see also FIG. 6) includes an interpolation unit 73 that interpolates values from the correlation matrix R to produce an interpolated matrix $R_{j1}$. The interpolation unit 73 performs the interpolation operation based on information indicative of the delays used by the interference statistic unit 65 (see also FIG. 6), as illustrated at 75. The signal processing path 61 includes a matrix inversion unit 74 that inverts the interpolated matrix $R_{j1}$ to produce an inverted matrix $R_{j1}^{-1}$. A multiplier 72 in the signal processing path 61 multiplies the inverted matrix $R_{j1}^{-1}$ by the channel estimate vector $h_{j1}$, which is produced by channel estimator 71 using pilot symbol despread values from the associated despreading unit. Embodiments that eliminate rows and columns of the shared correlation matrix R include a matrix reduction unit 53, as illustrated by broken line in FIG. 7.

In some embodiments, the individually interpolated correlation matrix for each user is not inverted, but is instead combined with the corresponding channel estimate vector h to compute the desired vector of combining weights directly, by solving $R_{jk}w=h_k$ for w. This is illustrated in FIG. 8.

Figure 8:
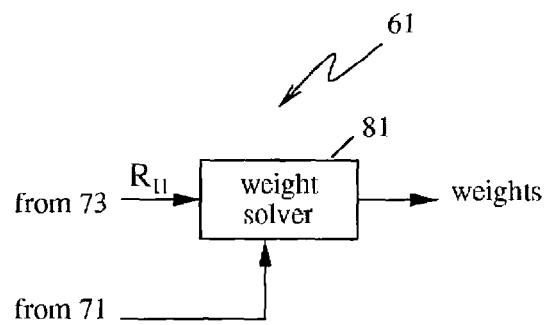
FIG. 8 diagrammatically illustrates a weight computer of FIG. 6 according to further exemplary embodiments of the invention.

FIG. 8 diagrammatically illustrates a weight computer unit of FIG. 6 according to exemplary embodiments of the invention. The example of FIG. 8 shows the weight computer unit for user 1 of FIG. 6. The remaining weight computer units of FIG. 6 are structurally and functionally analogous in some embodiments. As shown in FIG. 8, the signal processing path 61 includes a weight solving unit 81 that receives the channel estimate vector $h_1$ produced by channel estimator 71 (see also FIG. 7), and the interpolated correlation matrix $R_{j1}$ produced by interpolation unit 73 (see also FIG. 7). The weight solving unit 81 solves for the combining weight vector $w_1$ of user 1 by applying a suitable equation-solving technique (e.g., Gauss-Seidel) to the equation $R_{j1}w_1=h_{j1}$, and thereby computes the combining weights directly without matrix inversion.

Figure 10:
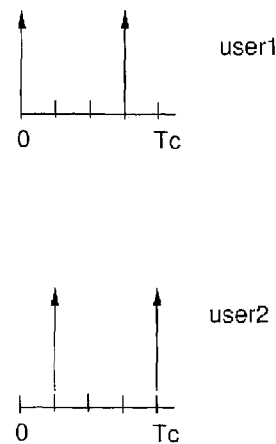
FIG. 10 graphically illustrates examples of users' rake finger delays.

In some embodiments, a set of impairment correlation values is calculated, and this set of correlation values is used by each user to construct its own individual correlation matrix. Referring to FIG. 10, a simple example with two users is illustrated. In the example of FIG. 10, user 1 has fingers placed at times 0 and ¾ in units of chip periods, and user 2 has fingers placed at times ¼ and 1 chip periods. According to conventional practice, user 1 would estimate the correlation between the two fingers by multiplying the chip sample at time 0 with the conjugate of the chip sample at time ¾, and averaging this product with other products corresponding to time pairs (1, 1¾) (2, 2¾), etc. This correlation is denoted herein as R(0, ¾), where the first index indicates a sampling phase, and the second index indicates the lag between two chip samples. User 1 also needs to estimate correlations of each finger with itself. Thus, for the first finger, user 1 would average products corresponding to time pairs (0,0), (1,1), (2,2), etc. Using the R(x,y) notation defined above, this correlation is denoted as R(0,0). For the second finger, user 1 would average products corresponding to time pairs (¾, ¾), (1¾, 1¾), etc. This correlation is thus denoted R(¾,0). Past samples can also be used, so that R(x,y) is periodic in x with period 1. For example, R(0,y) and R(1,y) are the same. Note that y is the lag. Thus, if there are 4 samples per chip, then only 4 values for x need to be considered, namely, x=0, x=¼, x=2/4, x=¾.

Similarly, user 2 would estimate the correlation between its two fingers by averaging products of chip samples corresponding to time pairs (¼,1), (1¼, 2), (2¼, 3), etc. This correlation is denoted herein as R(¼,¾). User 2 would also need to average products of chip samples corresponding to time pairs (¼,¼), (1¼,1¼), etc. This correlation is denoted herein as R(¼,0). Finally, user 2 would need to average products of chip samples corresponding to time pairs (1,1), (2,2), (3,3). This correlation can be denoted R(1,0).

The present invention recognizes that, because backward time averaging can be used, the correlation R(1,0) of the second finger of user 2 with itself could be formed by averaging (0,0), (1,1), (2,2) etc., which is the same as the aforementioned R(0,0) associated with user 1. So R(0,0) can be used by both user 1 and user 2. Accordingly, in some embodiments, a central processing unit receives finger delay information from all the users, and centrally computes all R(x,y)

values needed by all of the users. In the example of FIG. 10, this would involve computing R(0,0), R(¼,0), R(¾,0), R(0, ¾) and R(¼,¾). As mentioned above, R(0,0) can be calculated once, and then shared between the two users. In some embodiments, further efficiencies can be achieved by approximating R(x,y) as conjugate symmetric in y, that is, approximating that R(x,−y) and the conjugate of R(x,y) are the same.

In some embodiments, efficiency is improved by centrally pre-computing R(x,y) for predetermined finger delay values, and then interpolating the pre-computed correlation values to obtain the particular correlation values required by the users. For example, some embodiments pre-compute two autocorrelation functions. R(0,y) and R(½,y), where y=0, ¾, ⁶⁄₄, ⁹⁄₄ etc. Then, two-D interpolation is used to obtain any R(x,y) value needed by a user.

Some embodiments make an approximation that the R(x,y) does not change much for different x (i.e., is not sensitive to phase). Thus, for example, some embodiments only compute and use R(0,y), rather than R(0,y) and R(½,y) as above. In this case, only relative delay information is used when determining which R(x,y) value is used. Some embodiments average x out when determining an R(y) value. For example, estimates for R(0,y) and R(½,y) can be calculated as above, but the value of R(y) might be estimated by averaging the R(0,y) estimate and the R(½,y) estimate. An efficient way to average over all 4 phases would be, for example, to estimate R(y) by averaging (0, 0+y), (¾, ¾+y), (⁶⁄₄, ⁶⁄₄+y), etc.

For purposes of illustration, the exemplary operations for estimating R(x,y) values described above with respect to FIG. 10 have been presented in terms of their application to each receive antenna signal. Workers in the art will recognize that the cross-correlations between chip samples from different receive antennas can also be computed and processed analogously to the computations and processing described above with respect to FIG. 10.

Figure 11:
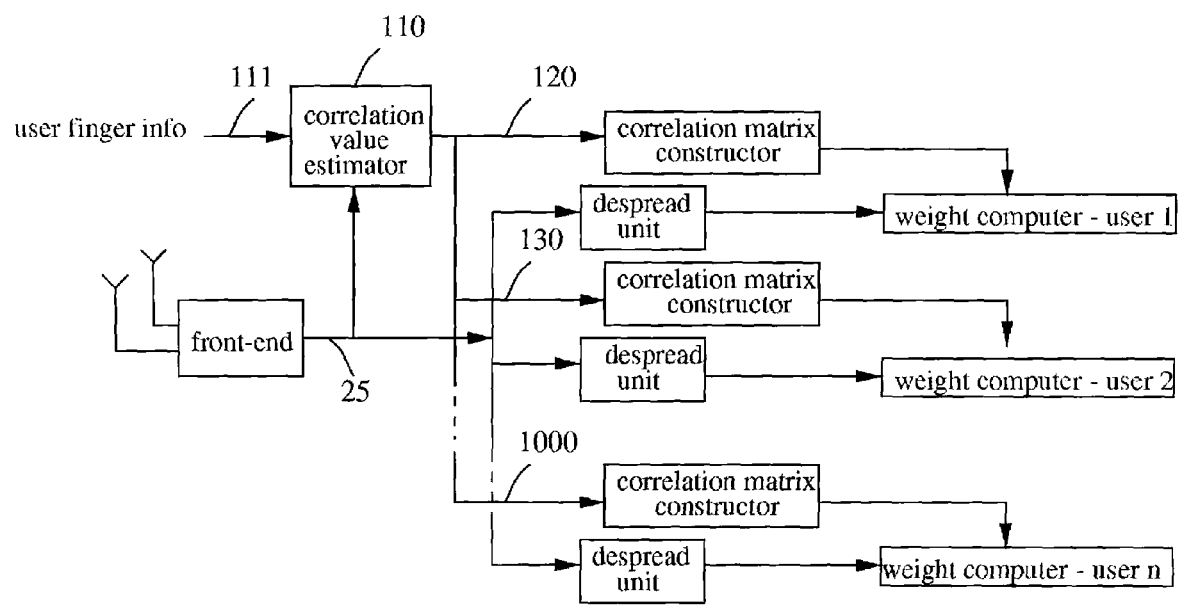
FIG. 11 diagrammatically illustrates a wireless communication receiver apparatus that uses a shared correlation values according to exemplary embodiments of the invention.

FIG. 11 diagrammatically illustrates a wireless communication receiver apparatus with interference suppression capability according to exemplary embodiments of the invention. In some embodiments, the apparatus of FIG. 11 is provided in a fixed-site base station such as shown in FIG. 1. In some embodiments, the apparatus of FIG. 11 can perform operations described above with respect to FIG. 10. The receiver of FIG. 11 includes an interference statistics unit 110 that can calculate estimates of all R(x,y) values required by the various users. In some embodiments, the unit 110 determines which R(x,y) estimates to calculate based on information indicative of the finger locations employed for the users, as illustrated at 111. Some embodiments use a predetermined range of x and y values to calculate R(x,y). In various embodiments, the unit 110 can produce the necessary set of correlation values in any of the exemplary manners described above with respect to FIG. 10. The set of correlation values R(x,y) produced by the unit 110 is made available to each of a plurality of signal processing paths 120, 130, ... 1000. These signal processing paths respectively extend into respective correlation matrix construction units that are respectively associated with the users. Each correlation matrix construction unit constructs the correlation matrix for its associated user from the correlation values produced by the unit 110. In some embodiments, the correlation matrix construction units can perform the interpolation operations described above with respect to FIG. 10. Each constructed correlation matrix is fed from the associated correlation matrix construction unit to an associated weight computer, which can compute the combining weights for the associated user, for example, according to the operation of the weight computers of FIG. 6.

Various embodiments of the invention use various approximate solutions to determine the weights vector w from the aforementioned system, Rw=h. For example, any vector that is dependent on at least R and h can be considered a valid w, regardless of whether: (1) R has been reduced by removing rows and/or columns; and/or (2) R has been interpolated; and/or (3) h has been zero padded. The required accuracy of the approximate solution varies among embodiments.

Further principles of the invention can be applied to parametric G-Rake receivers. In conventional parametric G-Rake receivers, to model self-interference, the impairment correlation matrix is written as $$R = E_c R_{ISI} + N_0 R_n$$

where $E_c$ is the total energy per chip period of the signal, $N_0$ is the noise power, and $R_{ISI}$ and $R_n$ are interference and thermal noise components, respectively. The correlation matrix $R_{ISI}$ depends on the pulse shape function, the chip period, the channel coefficients, and the delays. The correlation matrix $R_n$ depends on the pulse shape function and the delays. In response to the received signal, the parameters $E_c$ and $N_0$ are estimated independently for each user. Note that $E_c$ may be normalized by the energy-per-symbol of a pilot symbol. A similar model is sometimes used with chip equalizers. In general, $E_c$ and $N_0$ correspond to interference and signal powers, respectively.

Exemplary embodiments of the invention recognize that, in various circumstances, at least one of the parameters $E_c$ and $N_0$ can be expected to be about the same for all users. Accordingly, the common parameter value(s), i.e., $E_c$ and/or $N_0$, can be estimated for one user, and then the estimated parameter value(s) can be shared in common by all of the users. This reduces the computational complexity and cost, because only a single user needs to estimate the parameter(s). In some embodiments, the user for which the parameter estimation will be performed is selectable as desired. As an example, if each user within a group of users has the same rate (e.g. as would be the case for a group of voice users), and if the power control is functioning properly, then both $E_c$ and $N_0$ can be expected to be about the same for all of the users.

In some parametric G-Rake embodiments, the estimation of $E_c$ and/or $N_0$ is performed for each user within a subset of the group of users. The results are then averaged, and all users share the average estimated parameter value(s). This can improve the accuracy of the shared parameter estimate(s). In various embodiments, various subsets of the users are selected for estimation of $E_c$ and/or $N_0$. For any given embodiment, the corresponding subset can range in size from as small as at least any two of the users, to as large as all of the users, and can have any desired users as its members. In some embodiments, the membership of the subset of users for which parameter estimation will be performed is selectable as desired.

Figure 9:
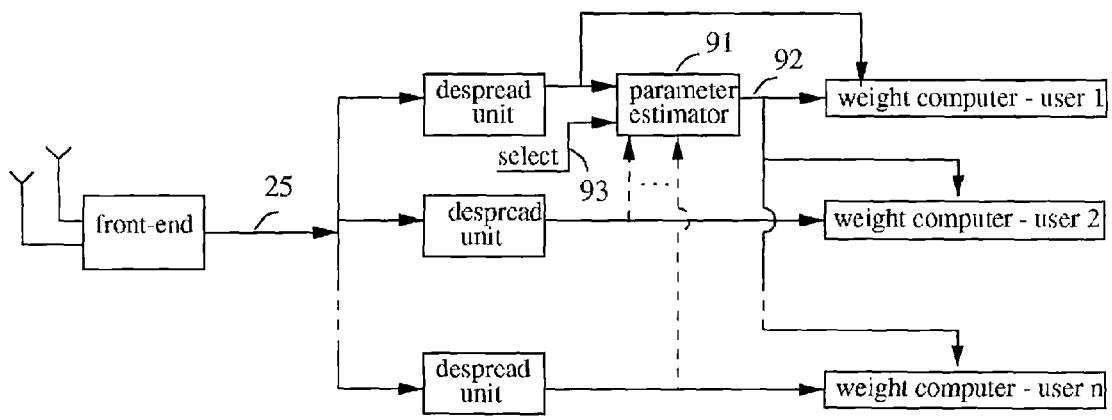
FIG. 9 diagrammatically illustrates a wireless communication receiver apparatus that uses a shared parameter estimate according to exemplary embodiments of the invention.

FIG. 9 diagrammatically illustrate a parametric G-Rake receiver apparatus that implements the above-described shared parameter estimation technique according to exemplary embodiments of the invention. In some embodiments, the apparatus of FIG. 9 is provided in a fixed-site base station such as shown in FIG. 1. The apparatus of FIG. 9 includes, for each user, a despreading unit that feeds despread signals to an associated weight computer unit. In response to the despread signals associated with one or more of the users, a parameter estimator 91 produces a parameter estimate 92 (e.g. an estimate of $E_c$ and/or $N_0$) that is shared and used in common by all users in the computation of their combining weights. The broken line inputs to the parameter estimator 91 represent embodiments wherein the despread signals from more than one of the despreading units are used to produce respectively corresponding parameter estimates that are averaged to produce the shared parameter estimate 92. The parameter estimator 91 includes a select input 93 that can be used to select the user(s) whose despread signals will be used for the parameter estimation operation.

Figure 15:
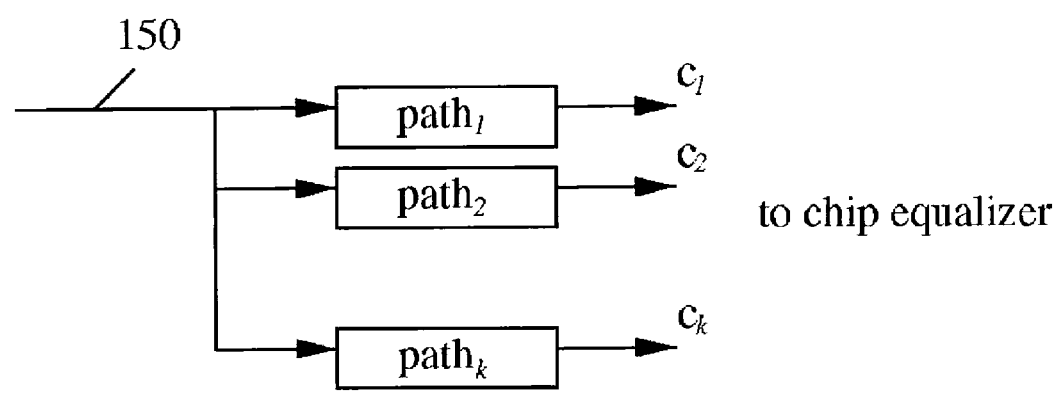
FIG. 15 is generally similar to FIGS. 3, 6, 9 and 11, but diagrammatically illustrates a wireless communication receiver apparatus that implements chip equalization according to exemplary embodiments of the invention.

FIG. 15 diagrammatically illustrates a wireless communication receiver apparatus with interference suppression capability according to exemplary embodiments of the invention. The receiver of FIG. 15 is similar to the receivers of FIGS. 3, 6, 9 and 11 in that statistical information about interference in a received uplink signal is shared among a plurality of users. However, FIG. 15 illustrates the use of this shared information in a receiver that implements chip equalization. As mentioned above, the filter coefficients of a chip-equalizing receiver correspond to the combining weights of a G-Rake receiver, and can be produced from the same type of correlation information used to produce the G-Rake combining weights. As will be apparent to workers in the art, the information that is shared among the users in the receivers of FIGS. 3, 6, 9, and 11 can be similarly shared among the users of a chip-equalizing receiver. In FIG. 15, the shared information, shown at 150, is provided to each of a plurality of signal processing paths, generally designated as path 1, path 2, . . . path K−1, and path K, where each of the paths corresponds to one of K users. These signal processing paths use the shared information to produce respectively corresponding sets of filter coefficients C1, C2, . . . C(K−1), and CK. These sets of filter coefficients are provided to respectively corresponding chip equalizers, where each chip equalizer corresponds to one of the K users. The chip equalizers perform conventional chip equalization based on the filter coefficients.

Although exemplary embodiments of the invention have been described above in detail, this does not limit the scope of the invention, which can be practiced in a variety of embodiments.

What is claimed is:

1. A CDMA wireless communication receiver apparatus, comprising:
   an input for providing a communication signal which has been transmitted over a wireless communication link and which includes interference and a plurality of communication signal components;
   an interference statistic unit coupled to said input for producing in response to said communication signal a set of data indicative of a statistical characteristic of said interference, wherein said set of data is an inverse correlation matrix associated with said interference;
   a plurality of signal processing paths that correspond respectively to said plurality of communication signal components, each of said signal processing paths coupled to said interference statistic unit, each of said signal processing paths receiving said set of data for sharing among each of said signal processing paths in common, and each of said signal processing paths applying to said shared set of data a signal processing operation associated with the corresponding communication signal component; and
   a plurality of channel estimators respectively associated with the communication signal components and coupled to said input for providing respective channel estimate vectors that are respectively associated with the communication signal components, and a plurality of vector adjusters respectively associated with the communication signal components, each said vector adjuster coupled between the associated channel estimator and the associated signal processing path, said vector adjusters applying respective adjustments to the associated channel estimate vectors to produce respectively corresponding adjusted vectors, and each said signal processing path combining the associated adjusted vector with said inverse correlation matrix to produce a weight vector for use in combining signals that have been despread for the associated communication signal component.

2. The apparatus of claim 1, wherein each of said adjustments includes zero-padding the associated channel estimate vector to compensate for a difference between rake finger delays employed for the associated communication signal component and delays used by said interference statistic unit to produce said data.

3. A CDMA wireless communication receiver apparatus, comprising:
   an input for providing a communication signal which has been transmitted over a wireless communication link and which includes interference and a plurality of communication signal components;
   an interference statistic unit coupled to said input for producing in response to said communication signal a set of data indicative of a statistical characteristic of said interference, wherein said set of data is an inverse correlation matrix associated with said interference;
   a plurality of signal processing paths that correspond respectively to said plurality of communication signal components, each of said signal processing paths coupled to said interference statistic unit, each of said signal processing paths receiving said set of data for sharing among each of said signal processing paths in common, and each of said signal processing paths applying to said shared set of data a signal processing operation associated with the corresponding communication signal component; and
   wherein said signal processing paths include respective matrix adjusters that apply respective adjustments to said inverse correlation matrix to produce respectively corresponding adjusted matrices, each said signal processing path receiving a channel estimation vector that corresponds to the associated communication signal component, and each said signal processing path combining the associated channel estimation vector with the associated adjusted matrix to produce a weight vector for use in combining signals that have been despread for the associated communication signal component.

4. The apparatus of claim 3, wherein each of said adjustments includes removing a portion of said inverse correlation matrix to compensate for a difference between rake finger delays employed for the associated communication signal component and delays used by said interference statistic unit to produce said data.

5. A CDMA wireless communication receiver apparatus, comprising:
   an input for providing a communication signal which has been transmitted over a wireless communication link and which includes interference and a plurality of communication signal components;
   an interference statistic unit coupled to said input for producing in response to said communication signal a set of data indicative of a statistical characteristic of said interference, wherein said set of data is a correlation matrix associated with said interference;
   a plurality of signal processing paths that correspond respectively to said plurality of communication signal components, each of said signal processing paths coupled to said interference statistic unit, each of said signal processing paths receiving said set of data for sharing among each of said signal processing paths in common, and each of said signal processing paths applying to said shared set of data a signal processing operation associated with the corresponding communication signal component; and wherein said signal processing paths include respective interpolation units for performing respective interpolation operations with respect to correlation values in said correlation matrix, each of said interpolation operations compensating for a difference between rake finger delays employed for the associated communication signal component and delays used by said interference statistic unit to produce said data.

6. The apparatus of claim 5, wherein each of said interpolation operations produces an interpolated matrix, said signal processing paths including respective matrix inverters, each said matrix inverter coupled to the associated interpolation unit for inverting the associated interpolated matrix to produce an inverted matrix, each said signal processing path receiving a channel estimation vector that corresponds to the associated communication signal component, and each said signal processing path combining the associated channel estimation vector with the associated inverted matrix to produce a weight vector for use in combining signals that have been despread for the associated communication signal component.

7. The apparatus of claim 5, wherein each of said interpolation operations produces an interpolated matrix, each said signal processing path receiving a channel estimation vector that corresponds to the associated communication signal component, and each said signal processing path using the associated channel estimation vector and the associated interpolated matrix to produce a weight vector for use in combining signals that have been despread for the associated communication signal component.

8. The apparatus of claim 7, wherein each said signal processing path applies a Gauss-Seidel operation with respect to the associated channel estimation vector and the associated interpolated matrix to produce the associated weight vector.

9. A CDMA wireless communication receiver apparatus, comprising:

an input for providing a communication signal which has been transmitted over a wireless communication link and which includes interference and a plurality of communication signal components;

an interference statistic unit coupled to said input for producing in response to said communication signal a set of data indicative of a statistical characteristic of said interference, wherein said interference statistic unit produces said set of data based on a set of delays;

a plurality of signal processing paths that correspond respectively to said plurality of communication signal components, each of said signal processing paths coupled to said interference statistic unit, each of said signal processing paths receiving said set of data for sharing among each of said signal processing paths in common, and each of said signal processing paths applying to said shared set of data a signal processing operation associated with the corresponding communication signal component; and wherein said interference statistic unit determines said delays based on information indicative of demodulation delays employed for said communication signal components.

10. The apparatus of claim 9, wherein, for each of said communication signal components, said demodulation delays employed for said communication signal components define a subset of said set of delays.

11. The apparatus of claim 10, wherein said set of delays is a union of said demodulation delays employed for said communication signal components.

12. A CDMA wireless communication receiver apparatus, comprising:

an input for providing a communication signal which has been transmitted over a wireless communication link and which includes interference and a plurality of communication signal components;

an interference statistic unit coupled to said input for producing in response to said communication signal a set of data indicative of a statistical characteristic of said interference, wherein said interference statistic unit produces said set of data based on a set of delays;

a plurality of signal processing paths that correspond respectively to said plurality of communication signal components, each of said signal processing paths coupled to said interference statistic unit, each of said signal processing paths receiving said set of data for sharing among each of said signal processing paths in common, and each of said signal processing paths applying to said shared set of data a signal processing operation associated with the corresponding communication signal component; and wherein, said set of delays is an equally spaced grid of delays, and some demodulation delays employed for said communication signal components are not synchronized with any of said delays.

13. A CDMA wireless communication receiver apparatus, comprising:

an input for providing a communication signal which has been transmitted over a wireless communication link and which includes interference and a plurality of communication signal components;

an interference statistic unit coupled to said input for producing in response to said communication signal a set of data indicative of a statistical characteristic of said interference;

a plurality of signal processing paths that correspond respectively to said plurality of communication signal components, each of said signal processing paths coupled to said interference statistic unit, each of said signal processing paths receiving said set of data for sharing among each of said signal processing paths in common, and each of said signal processing paths applying to said shared set of data a signal processing operation associated with the corresponding communication signal component; and wherein said set of data includes a set of correlation values associated with said interference, said signal processing paths including respective matrix construction units, each said matrix construction unit using correlation values from said set to produce for the associated communication signal component a corresponding correlation matrix associated with said interference.

14. The apparatus of claim 13, wherein said matrix construction units interpolate correlation values of said set.

15. The apparatus of claim 13, wherein said interference statistic unit produces said correlation values by averaging correlation values that correspond to different chip sample phases.

16. The apparatus of claim 13, wherein all of said correlation values of said set correspond to the same chip sample phase.

17. A method for use in a CDMA communication receiver, comprising:
  providing a communication signal which has been transmitted over a wireless communication link and which includes interference and a plurality of communication signal components;
  producing, by an interference statistic unit, in response to said communication signal a set of data indicative of a statistical characteristic of said interference, wherein said set of data is an inverse correlation matrix associated with said interference, and including, for each of said communication signal components,
    applying an adjustment to a channel estimate vector associated with the
    communication signal component to produce a corresponding adjusted vector, and
    combining the adjusted vector with said inverse correlation matrix to produce a weight vector for use in combining signals that have been despread for the communication signal component;
  making said set of data available to be shared in support of each of said communication signal components in common; and
  for each of said communication signal components, applying to said shared set of data a signal processing operation associated with said communication signal component.

18. The method of claim 17, wherein each of said adjustments includes zero-padding the associated channel estimate vector to compensate for a difference between rake finger delays employed for the associated communication signal component and delays used in said producing step.

19. A method for use in a CDMA communication receiver, comprising:
  providing a communication signal which has been transmitted over a wireless communication link and which includes interference and a plurality of communication signal components;
  producing, by an interference statistic unit, in response to said communication signal a set of data indicative of a statistical characteristic of said interference, wherein said set of data is an inverse correlation matrix associated with said interference, and including, for each of said communication signal components,
    applying an adjustment to said inverse correlation matrix to produce a corresponding adjusted matrix, and
    combining the adjusted matrix with a channel estimation vector associated with the communication signal component to produce a weight vector for use in combining signals that have been despread for the communication signal component;
  making said set of data available to be shared in support of each of said communication signal components in common; and
  for each of said communication signal components, applying to said shared set of data a signal processing operation associated with said communication signal component.

20. The method of claim 19, wherein each of said adjustments includes removing a portion of said inverse correlation matrix to compensate for a difference between rake finger delays employed for the associated communication signal component and delays used in said producing step.

21. A method for use in a CDMA communication receiver, comprising:
  providing a communication signal which has been transmitted over a wireless communication link and which includes interference and a plurality of communication signal components;
  producing, by an interference statistic unit, in response to said communication signal a set of data indicative of a statistical characteristic of said interference, wherein said set of data is a correlation matrix associated with said interference, and including, for each of said communication signal components, performing an interpolation operation with respect to correlation values in said correlation matrix to compensate for a difference between rake finger delays employed for the communication signal component and delays used in said producing step;
  making said set of data available to be shared in support of each of said communication signal components in common; and
  for each of said communication signal components, applying to said shared set of data a signal processing operation associated with said communication signal component.

22. The method of claim 21, wherein each of said interpolation operations produces an interpolated matrix, and including: for each of said communication signal components,
  inverting the associated interpolated matrix to produce an inverted matrix, and
  combining the inverted matrix with a channel estimation vector associated with the communication signal component to produce a weight vector for use in combining signals that have been despread for the communication signal component.

23. The method of claim 21, wherein each of said interpolation operations produces an interpolated matrix, and including, for each of said communication signal components, using the associated interpolated matrix and a channel estimation vector associated with the communication signal component to produce a weight vector for use in combining signals that have been despread for the communication signal component.

24. The method of claim 23, wherein said using step includes applying a Gauss-Seidel operation with respect to the channel estimation vector and the interpolated matrix to produce the associated weight vector.

25. A method for use in a CDMA communication receiver, comprising:
  providing a communication signal which has been transmitted over a wireless communication link and which includes interference and a plurality of communication signal components;
  producing, by an interference statistic unit, in response to said communication signal a set of data indicative of a statistical characteristic of said interference, wherein said producing step includes producing said set of data based on a set of delays;
  determining said delays based on information indicative of demodulation delays employed for said communication signal components;
  making said set of data available to be shared in support of each of said communication signal components in common; and
  for each of said communication signal components, applying to said shared set of data a signal processing operation associated with said communication signal component.

26. The method of claim 25, wherein, for each of said communication signal components, said demodulation delays employed for said communication signal component define a subset of said set of delays.

27. The method of claim 26, wherein said set of delays is a union of said demodulation delays employed for said communication signal components.

28. A method for use in a CDMA communication receiver, comprising:
provolving a communication signal which has been transmitted over a wireless communication link and which includes interference and a plurality of communication signal components:
producing, by an interference statistic unit, in response to said communication signal a set of data indicative of a statistical characteristic of said interference, wherein said producing step includes producing said set of data based on a set of delays; wherein said set of delays is an equally spaced grid of delays, and some of said demodulation delays employed for said communication signal components are not synchronized with any of said delays;
making said set of data available to be shared in support of each of said communication signal components in common; and
for each of said communication signal components, applying to said shared set of data a signal processing operation associated with said communication signal component.

29. A method for use in a CDMA communication receiver, comprising:
providing a communication signal which has been transmitted over a wireless communication link and which includes interference and a plurality of communication signal components;
producing, by an interference statistic unit, in response to said communication signal a set of data indicative of a statistical characteristic of said interference, wherein said set of data includes a set of correlation values associated with said interference, and including, for each of said communication signal components,
using correlation values from said set to produce for the associated communication signal component a corresponding correlation matrix associated with said interference, wherein said using step includes interpolating correlation values of said set;
making said set of data available to be shared in support of each of said communication signal components in common; and
for each of said communication signal components, applying to said shared set of data a signal processing operation associated with said communication signal component.

30. A method for use in a CDMA communication receiver, comprising:
providing a communication signal which has been transmitted over a wireless communication link and which includes interference and a plurality of communication signal components;
producing, by an interference statistic unit, in response to said communication signal a set of data indicative of a statistical characteristic of said interference, wherein said set of data includes a set of correlation values associated with said interference, and including, for each of said communication signal components,
using correlation values from said set to produce for the associated communication signal component a corresponding correlation matrix associated with said interference, wherein all of said correlation values of said set correspond to the same chip sample phase;
making said set of data available to be shared in support of each of said communication signal components in common; and
for each of said communication signal components, applying to said shared set of data a signal processing operation associated with said communication signal component.

31. A CDMA communication receiver apparatus, comprising:
an input for providing a communication signal which has been transmitted over a wireless communication link and which includes interference and a plurality of communication signal components;
a plurality of signal producing units respectively associated with said communication signal components, each said signal producing unit coupled to said input for providing, in response to said communication signal, further signals that are to be combined for the associated communication signal component;
a parameter estimator coupled to at least one of said signal producing units for providing a parameter estimate in response to the associated further signals, wherein said parameter estimator is coupled to more than one of said signal producing units, said parameter estimator making initial parameter estimates in response to the further signals produced by said coupled signal producing units, and said parameter estimator producing said shared parameter estimate based on said initial parameter estimates; and
a plurality of weight units respectively associated with said communication signal components and respectively coupled to said signal producing units, each of said weight units coupled to said parameter estimator for sharing said parameter estimate in common, each of said weight units responsive to said parameter estimate for providing for the associated communication signal component a plurality of weights for use in processing the associated further signals.

32. The apparatus of claim 31, wherein said shared parameter estimate is an average of said initial parameter estimates.

33. A CDMA communication receiver apparatus, comprising:
an input for providing a communication signal which has been transmitted over a wireless communication link and which includes interference and a plurality of communication signal components;
a plurality of signal producing units respectively associated with said communication signal components, each said signal producing unit coupled to said input for providing, in response to said communication signal, further signals that are to be combined for the associated communication signal component;
a parameter estimator coupled to at least one of said signal producing units for providing a parameter estimate in response to the associated further signals; and
a plurality of weight units respectively associated with said communication signal components and respectively coupled to said signal producing units, each of said weight units coupled to said parameter estimator for sharing said parameter estimate in common, each of said weight units responsive to said parameter estimate for providing for the associated communication signal component a plurality of weights for use in processing the associated further signals, wherein said shared parameter estimate includes an estimate of one of noise power and interference power of said communication signal.

34. A CDMA communication receiver apparatus, comprising:

an input for providing a communication signal which has been transmitted over a wireless communication link and which includes interference and a plurality of communication signal components;

a plurality of signal producing units respectively associated with said communication signal components, each said signal producing unit coupled to said input for providing, in response to said communication signal, further signals that are to be combined for the associated communication signal component;

a parameter estimator coupled to at least one of said signal producing units for providing a parameter estimate in response to the associated further signals; and a plurality of weight units respectively associated with said communication signal components and respectively coupled to said signal producing units, each of said weight units coupled to said parameter estimator for sharing said parameter estimate in common, each of said weight units responsive to said parameter estimate for providing for the associated communication signal component a plurality of weights for use in processing the associated further signals, wherein said shared parameter estimate includes estimates of noise power and interference power of said communication signal.

* * * * *